United States Patent
Mosinskis et al.

(10) Patent No.: US 7,515,778 B2
(45) Date of Patent: Apr. 7, 2009

(54) SEGMENTED OPTICAL MODULATOR

(75) Inventors: Paulius Mindaugas Mosinskis, Richlandtown, PA (US); Robert Keith Montgomery, Easton, PA (US); Prakash Gothoskar, Allentown, PA (US)

(73) Assignee: Lightwire, Inc., Allentown, PA (US)

( * ) Notice: Subject to any disclaimer, the term of this patent is extended or adjusted under 35 U.S.C. 154(b) by 0 days.

(21) Appl. No.: 11/973,440

(22) Filed: Oct. 9, 2007

(65) Prior Publication Data

US 2008/0089634 A1 Apr. 17, 2008

Related U.S. Application Data

(60) Provisional application No. 60/849,894, filed on Oct. 7, 2006.

(51) Int. Cl.
*G02F 1/225* (2006.01)
(52) U.S. Cl. .............................. 385/3; 385/2
(58) Field of Classification Search ................ None
See application file for complete search history.

(56) References Cited

U.S. PATENT DOCUMENTS

| | | | | |
|---|---|---|---|---|
| 5,157,744 A | * | 10/1992 | Korotky | 385/2 |
| 5,237,629 A | * | 8/1993 | Hietala et al. | 385/3 |
| 5,249,243 A | | 9/1993 | Skeie | |
| 5,291,565 A | * | 3/1994 | Schaffner et al. | 385/3 |
| 5,359,449 A | * | 10/1994 | Nishimoto et al. | 398/198 |
| 5,455,876 A | | 10/1995 | Hopfer et al. | |
| 5,671,302 A | | 9/1997 | Skeie | |
| 5,801,872 A | | 9/1998 | Tsuji | |
| 6,163,395 A | | 12/2000 | Nemecek | |
| 6,384,954 B1 | | 5/2002 | Webb | |
| 6,781,741 B2 | | 8/2004 | Uesaka | |
| 6,845,198 B2 | | 1/2005 | Montgomery et al. | |
| 6,862,124 B2 | | 3/2005 | Akiyama et al. | |
| 6,937,790 B2 | | 8/2005 | Bridges | |
| 6,956,982 B1 | | 10/2005 | Heideman et al. | |
| 6,961,166 B2 | | 11/2005 | Wooten et al. | |
| 7,050,689 B2 | | 5/2006 | Wipiejewski et al. | |
| 7,065,301 B2 | | 6/2006 | Shastri et al. | |
| 7,212,326 B2 | | 5/2007 | Wooten et al. | |
| 7,251,408 B1 | | 7/2007 | Gunn, III et al. | |
| 7,277,603 B1 | * | 10/2007 | Roberts et al. | 385/1 |
| 2004/0001659 A1 | * | 1/2004 | Samara-Rubio et al. | 385/3 |
| 2008/0095486 A1 | * | 4/2008 | Shastri et al. | 385/3 |

OTHER PUBLICATIONS

S. Lau et al. Integrated AlGaAs waveguide components for optical phase difference measurement and correction. IEEE Journal of Quantum Electronics, 30:6:1417-1426, Jun. 1994.*

* cited by examiner

*Primary Examiner*—Uyen Chau N Le
*Assistant Examiner*—Mike Stahl
(74) *Attorney, Agent, or Firm*—Wendy W. Koba

(57) ABSTRACT

An optical modulator is formed to include an adjustable drive arrangement for dynamically adjusting the effective length of the optical signals path(s) within the modulator. Each modulator arm is partitioned into a plurality of segments, with each segment coupled to a separate electrical signal driver. Therefore, the effective length of each modulator arm will be a function of the number of drivers that are activated for each arm at any given point in time. A feedback arrangement may be used with the plurality of drivers to dynamically adjust the operation of the modulator by measuring the extinction ratio as a function of optical power, turning "on" or "off" individual drivers accordingly.

6 Claims, 3 Drawing Sheets

SEGMENTED OPTICAL MODULATOR

CROSS-REFERENCE TO RELATED APPLICATION

This application claims the benefit of U.S. Application No. 60/849,894, filed Oct. 7, 2006.

TECHNICAL FIELD

The present invention is directed to an optical modulator and, more particularly, to an optical modulator including an adjustable drive arrangement for dynamically adjusting the effective length of the optical signals path(s) within the modulator.

BACKGROUND OF THE INVENTION

Optical transmission systems are generally based on one of two methods of modulation of an optical signal, either direct modulation or external modulation. In the first of these methods, the bias current directly applied to a laser is modulated, turning the laser "on" and "off". The disadvantage of this method is that when higher switching speeds are required, the dynamic behavior of the semiconductor material of the laser itself introduces distortion, primarily in the form of chirp. External modulation of an optical signal is accomplished by applying an electrical modulating signal to a continuous wave (CW) output from a laser source. Inasmuch as such an arrangement produces a modulated optical output signal with significantly reduced chirp, external modulators have become preferred for high speed applications. In particular, electro-optic modulators such as Mach Zehnder interferometers (MZIs) are typically used for high speed applications.

For many years, external modulators have been made out of electro-optic material, such as lithium niobate. Optical waveguides are formed within the electro-optic material, with metal contact regions disposed on the surface of each waveguide arm. The application of a voltage to a metal contact will modify the refractive index of the waveguide region underneath the contact, thus changing the speed of propagation along the waveguide. By applying the voltage(s) that produce a π phase shift between the two arms, a nonlinear (digital) Mach-Zehnder modulator is formed. In particular, the optical signal is launched into the waveguide and the I/O electrical digital signal is applied to the contacts (using proper voltage levels, as mentioned above). A CW optical input signal is then "modulated" to create an optical I/O output signal. A similar result is possible with a linear (analog) optical output signal.

Although this type of external modulator has proven extremely useful, there is an increasing desire to form various optical components, subsystems and systems on silicon-based platforms. It is further desirable to integrate the various electronic components associated with such systems (for example, the input electrical data drive circuit for an electro-optic modulator) with the optical components on the same silicon substrate. Clearly, the use of lithium niobate-based optical devices in such a situation is not an option. Various other conventional electro-optic devices are similarly of a material (such as III-V compounds) that are not directly compatible with a silicon platform.

Recent advances have been made the capability of forming optical devices, such as the modulator described above, within a silicon platform, based on free carrier modulation. In this configuration, the phase-shifting elements forming the modulator arms take the form of MOS capacitors formed along silicon waveguides. An applied voltage induces an accumulation of charges near the gate dielectric of the capacitor which, in turn, modifies the refractive index profile of the waveguide and ultimately the optical phase of the light passing through the waveguide. See, for example, U.S. Pat. Nos. 6,845,198 and 7,065,301, both assigned to the assignee of this application.

When designing the electrical drive portion of an external modular, the physical parameters of the modulator itself should be considered in order to optimize both the optical and electrical parameters of the design. For reasons of power dissipation, for example, it is desirable to design a modulator driver that can trade optical extinction ratio for power. Adjusting the output amplitude of most drivers to accomplish this goal is problematic: it usually results in a change in edge rate and, depending on driver topology, might not reduce power dissipation.

SUMMARY OF THE INVENTION

The need remaining in the art is addressed by the present invention which relates to an optical modulator and, more particularly, to an optical modulator including an adjustable drive arrangement for dynamically adjusting the effective length of the optical signals path(s) within the modulator.

It has been realized that an optical modulator's extinction ratio is based on the phase shift between the two arms of the modulator. Therefore, instead of adjusting the amplitude of the driver to modify the extinction ratio (as taught in the prior art), the present invention is directed to dynamically adjusting the effective length of the modulating portion of the structure while maintaining a constant electrical input voltage swing from the driver.

In accordance with the present invention, each modulator arm is partitioned into a plurality of segments, with each segment coupled to a separate driver. Therefore, the effective length of each modulator arm will be a function of the number of drivers that have been activated for each arm at any given point in time. A feedback arrangement may be used with the plurality of drivers to dynamically adjust the operation of the modulator by measuring the extinction ratio as a function of optical power, turning "on" or "off" individual drivers accordingly.

It is an aspect of the present invention that the individual drivers are independently enabled/disabled. When a driver is enabled, the associated segment of the modulator will contribute to the phase shift of the propagating optical signal. When the driver is disabled, that portion of the modulator will not affect the signal's phase and will not contribute to the "effective length" of the modulator. Inasmuch as each segment has its own driver, when a selected segment is disabled, the power dissipation for that segment of the driver is negligible.

Other and further aspects and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
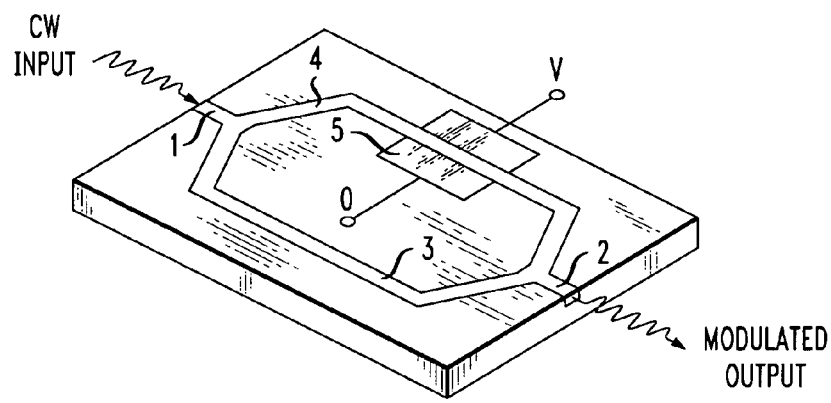
FIG. 1 illustrates, in simplified form, a typical prior art electro-optic modulator

FIG. 1 illustrates an exemplary prior art Mach-Zehnder modulator that may be re-configured as shown below to utilize the segmented drive arrangement of the present invention. As shown, the prior art modulator comprises an input waveguide section 1 and an output waveguide section 2. A pair of waveguiding modulator arms 3 and 4 are shown and formed in one embodiment to include a capacitor-like structure.

In operation, an incoming continuous wave (CW) light signal from a laser source (not shown) is coupled into input waveguide section 1. The CW signal is coupled into waveguide arms 3 and 4, wherein the application of an electrical drive signal to these arms will provide the desired phase shift to modulate the optical signal, forming a modulated optical output signal along output waveguide 2. A pair of electrodes 5 are illustrated in association with modulator arm 4 and used to provide the electrical drive signal to arm 4. A similar pair of electrodes may be associated with arm 3 to likewise introduce a delay onto the propagating optical signal.

For reasons of power dissipation, it is desirable to design a modulator driver that can trade optical extinction ratio for power. Adjusting the output amplitude of most drivers to accomplish this goal is problematic; it usually results in a change in edge rate (i.e., transition time between an optical "1" and optical "0") and, depending on driver topology, might not reduce power dissipation. An alternative to adjusting the amplitude of the driver to adjust the extinction ratio is to realize that the extinction ratio is based on the phase shift between the two arms of the MZI. Therefore, it has been found that the extinction ratio of the output optical signal can be adjusted (while maintaining a constant electrical swing on the drive voltage) by dynamically adjusting the effective length of the modulated portion of the modulator structure.

Figure 2:
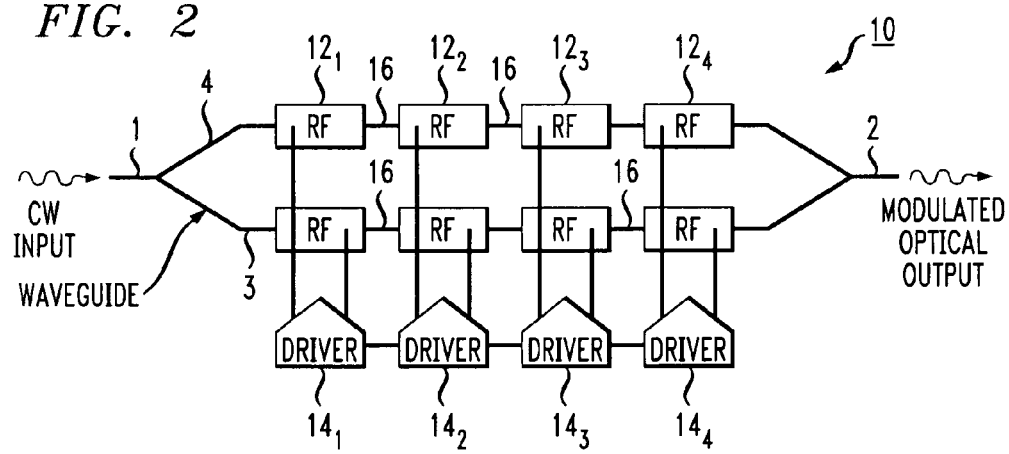
FIG. 2 illustrates an exemplary segmented electro-optic modulator formed in accordance with the present invention.
Figure 4:
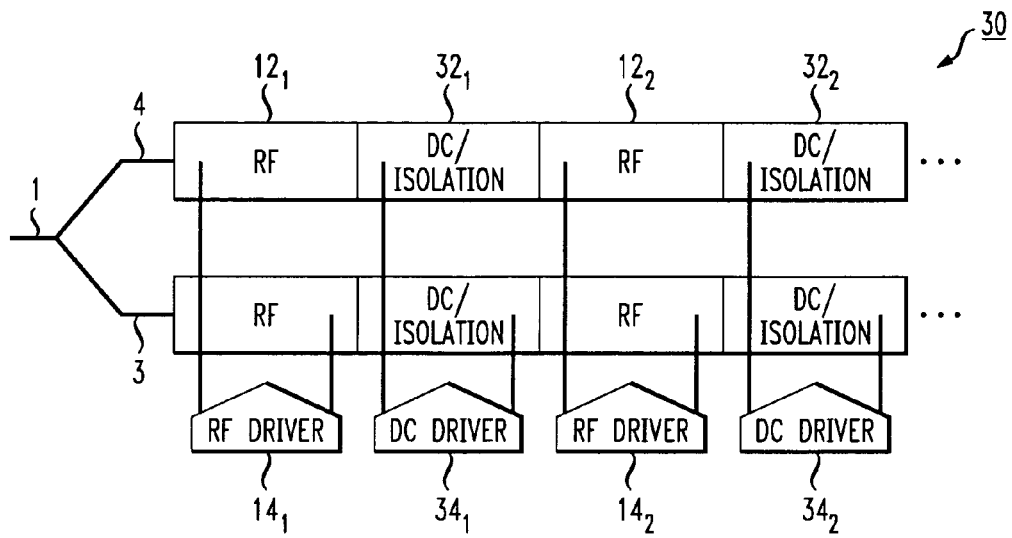
FIG. 4 illustrates an alternative embodiment of the present invention, showing alternating sections of RF modulation and DC bias.
Figure 5:
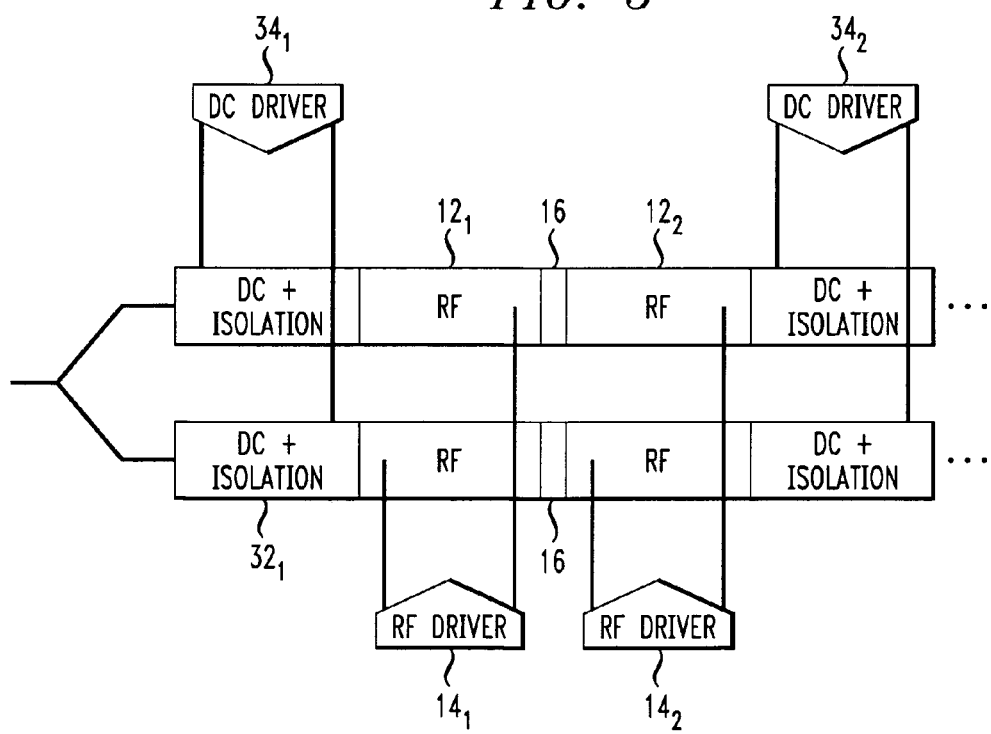
FIG. 5 is another arrangement of the embodiment of FIG. 4.

One way to accomplish this dynamic adjustment in accordance with the present invention is to partition the modulator layout into a plurality of contiguous segments, with a plurality of separate drivers coupled to the modulator segments in a one-to-one relationship. FIG. 2 illustrates an exemplary embodiment of the present invention, showing a segmented modulator 10 partitioned to form a plurality of modulation segments $12_1$-$12_4$, each modulation segment 12 controlled by a separate one of a plurality of electrical signal drivers $14_1$-$14_4$. It is to be understood that the number and arrangement of the partitions is at the discretion of the designer, where FIGS. 4 and 5 illustrate alternative embodiments that will be discussed in detail hereinafter.

Referring again to FIG. 2, an incoming CW lightwave signal is applied as an input along input waveguide section 1 (as with the prior art arrangement described above in FIG. 1), the optical signal then being split along waveguide arms 3 and 4. The application of one or more RF signals to modulation segments 12 will induce a predetermined phase shift between the optical signals propagating along arms 3 and 4, forming a modulated output signal along output waveguide section 2. In accordance with the present invention, individual ones of the drivers $14_1$-$14_4$ are enabled/disabled to control the amount of phase shift introduced into the propagating optical signal. That is, if driver $14_4$ is disabled while the remaining drivers $14_1$-$14_3$ are enabled, only modulation segments $12_1$-$12_3$ will contribute phase shift to the propagating optical signal. If it is determined thereafter that an additional amount of phase shift is required to improve the extinction ratio, then driver $14_4$ can be turned "on" to contribute its modulation component to the phase shift.

Inasmuch as the individual drivers are disabled when not used, there is no power dissipation associated with that driver or with the operation of that portion of the modulator structure. This is considered as an improvement over prior art arrangements which utilized a single driver that was required to always be "on" and drawing power. Additionally, by partitioning the modulation into a plurality of segments, the modulator's phase shift per volt no longer has to be known prior to designing the modulator. Instead, a plurality of drivers 14 may be cascaded along contiguous segments 12 of modulator 10 and the particular number of drivers 14 that are required to provide the desired performance can be determined on a case-by-case basis. Moreover, performance changes associated with changes in age, ambient conditions and the like can be accommodated during the life of modulator 10 by selectively enabling/disabling various ones of the drivers 14. This feedback aspect of the present invention is described more fully below in association with FIG. 6.

While the arrangement of FIG. 2 shows each driver 14 coupled to both arms 3 and 4 of its associated modulation segment 12, various other "single arm" drive embodiments are also possible.

Importantly, each modulation segment 12 needs to remain electrically isolated from its adjoining segments. Referring to FIG. 2, reference numeral 16 is used to identify each isolation location along both modulator arms 3 and 4. Since the material forming waveguide arms 3 and 4 is electrically conductive, isolation locations 16 are necessary to prevent the formation of a low resistance path between adjacent segments 12, where the presence of such a low resistance path would prevent selected drivers 14 from being disabled. A straightforward approach for providing this isolation is to utilize physically separate elements for each segments. Alternatively, regions of dielectric material may be formed between adjacent modulator segments and used to provide electrical isolation therebetween.

Figure 3:
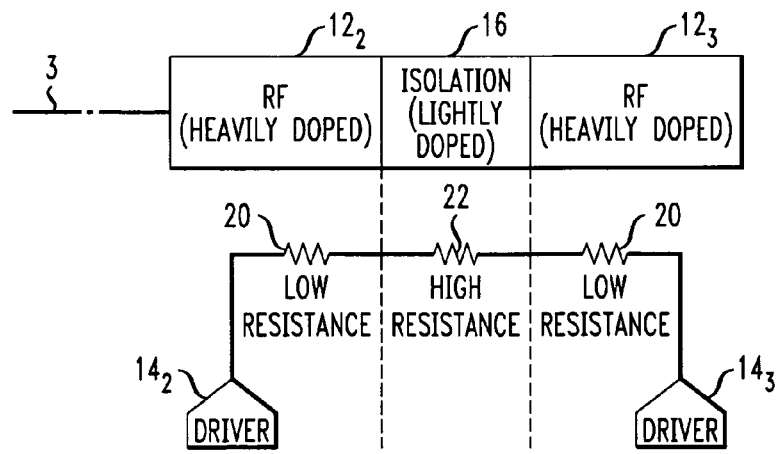
FIG. 3 contains a portion of the modulator of FIG. 2, showing in particular an exemplary configuration for providing isolation between adjoining modulation sections of the modulator.

FIG. 3 illustrates one exemplary alternative to the "physically separate elements" embodiment of FIG. 2, where the FIG. 3 arrangement provides for the desired inter-segment isolation in the modulator structure of the present invention by controlling the dopant concentrations within the optical waveguides. Advantageously, this embodiment allows for a single, continuous layer of waveguiding material to be used to form the modulator arms 3 and 4, a preferred alternative. In particular, FIG. 3 illustrates a portion of modulator arm 3 including modulation segments $12_2$ and $12_3$, with isolation location 16 formed therebetween. In this case, the isolation is provided by modifying the dopant concentration within location 16 as compared to the dopant concentration in segments $12_2$ and $12_3$. The modulation segments 12 require a relatively heaving doping (either n-type or p-type) to provide the change in refractive index associated with the change in phase shift (as a function of the voltage applied by driver 14). Therefore, rather than allowing the entire length of modulator arm to be heavily doped, lightly doped isolation regions 16 are formed between each heavily-doped modulation section 12, forming a "variegated" structure.

FIG. 3 further illustrates the schematic result of such doping, shown as a low resistance 20 associated with drivers $14_2$ and $14_3$ (i.e., heavily-doped modulation segments $12_2$ and $12_3$) and a high resistance 22 associated with isolation location 16 (i.e., lightly doped).

By virtue of the fact that the length and placement of the various modulation segments 12 along modulator arms 3 and 4 can be controlled/defined by similarly controlling/defining the dopant concentration along arms 3, 4, it is possible with conventional CMOS processing technology to modify the dopant pattern in many different alternatives. Indeed, proper placement of the heavily-doped and lightly-doped regions can be used to optimize the locations of the various modulation segments 12 and a plurality of low speed/DC segments that may be used for other applications. In particular, since both isolation locations 16 and low speed sections may exhibit a high resistance, any necessary low speed sections may also be interspersed with the high speed modulation sections as described above.

FIG. 4 illustrates a portion of an exemplary modulator 30 which is configured to including alternating modulation segments 12 and DC/isolation segments 32. As before, each modulation segment 12 is coupled to a separate driver 14, where each driver 14 may be individually enabled/disabled to control the effective length of modulator 30. Each DC/isolation segment 32 is further shown as coupled to a separate DC driver 34, where DC driver may be used to provide either a DC bias signal or, alternatively, a low speed modulation signal. Thus, the arrangement as shown in FIG. 4 allows for an integrated modulation structure to be formed that is capable of providing both high speed and low speed input drive signals to the same modulation structure.

As mentioned above, the ordering of the various segments along the modulator arms is a matter of design choice. FIG. 5 shows an alternative arrangement of the embodiment of FIG. 4, where in this case the DC segments 32 are positioned at the input and output of modulator arms 3, 4 and the RF segments 12 are disposed along the central region. As discussed above, the need remains to provide some type of electrical isolation between contiguous RF segments, shown in this embodiment by isolation locations 16.

Figure 6:
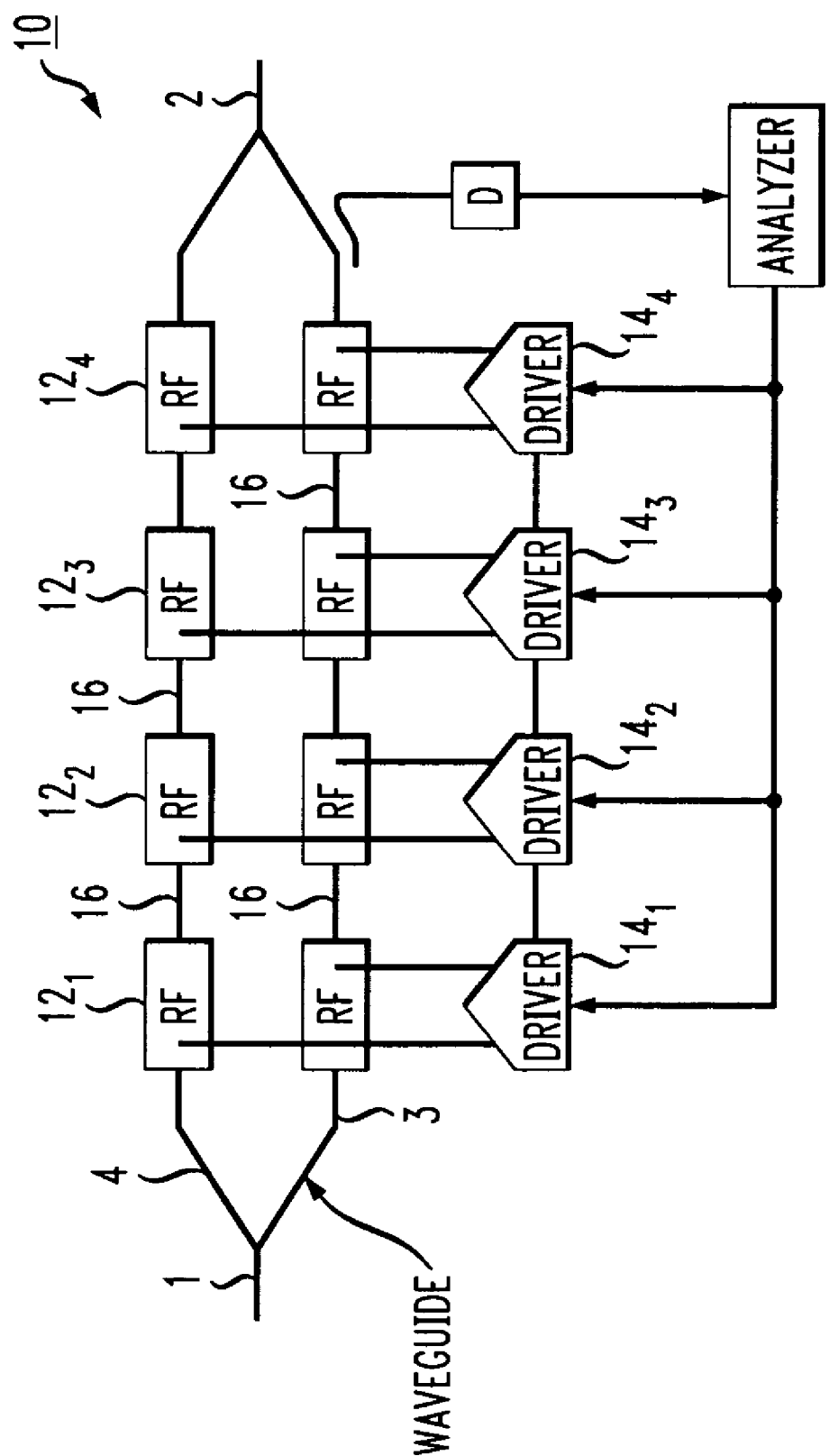
FIG. 6 illustrates an alternative embodiment of the present invention, including a feedback loop between the modulated optical output signal and the electrical driver input signal.

FIG. 6 illustrates an alternative to the embodiment of FIG. 2, where in this case a feedback path is established between the modulated optical output signal and the input to the plurality of electrical drivers 14. The feedback signal is used, at least in accordance with the present invention, to control the number of segments 12 that are energized to be used in the operation of modulator 10. Referring to FIG. 6, a tap waveguide 40 is coupled to output waveguide 2 to remove a portion of the modulated output signal. This tapped-off portion is then applied as an input to a photodetector 42, converting the optical signal into an electrical equivalent. The electrical signal is then provided as an input to an analyzer unit 44 that may, for example, determine the power of the optical output signal based upon the value of the converted electrical signal. The determined power value may then be compared against a known, desired value, where this determination is used to control turning off/on (i.e., disabling/enabling) different ones of the plurality of drivers 14 in order to create the extinction ratio required to optimize the optical output power. As mentioned above, the measured power may change over time as a function of various changes in operating conditions. Therefore, the elements of the feedback path may be used to continuously measure the optical output power and continuously adjust the operational state of each driver.

The embodiments of the present invention described above are intended to be exemplary only. The scope of the invention is therefore intended to be limited solely by the scope of the claims appended hereto.

What is claimed is:

1. An external modulator for an optical input source, creating a modulated optical output signal with a dynamically adjustable extinction ratio, the external modulator comprising an input waveguiding section for receiving a continuous wave (CW) optical input signal;

an input optical splitter, coupled to the output of the input waveguiding section for dividing the CW optical input signal into a pair of CW optical input signals;

a pair of optical waveguides coupled to the outputs of the input optical splitter, the pair of optical waveguides forming a pair of modulator arms for supporting the propagation of the optical signal, each modulator arm partitioned into a plurality of N waveguide modulator segments with a separate isolation region disposed between adjacent waveguide modulator segments;

a plurality of modulator electrodes disposed adjacent to each waveguide modulator segment of the plurality of N waveguide modulator segments in a one-to-one relationship;

a plurality of N separate electrical drive signal sources, each source coupled through modulator electrodes to a separate waveguide modulator segment of the plurality of N waveguide modulator segments, each drive signal source separately energized/de-energized to control the phase shift present between the optical signals propagating along each arm of the pair of modulator arms so as to dynamically adjust the extinction ratio, providing at the output of the pair of modulator arms a pair of modulated optical signals;

an output optical combiner for combining the pair of modulated optical signals into a modulated optical output signal; and an output waveguiding section coupled to the output of the output optical combiner for supporting the propagation of the modulated optical output signal.

2. An external modulator as defined in claim 1 wherein each isolation region comprises a dielectric material disposed between adjacent waveguide modulator segments to provide isolation therebetween.

3. An external modulator as defined in claim 1 wherein each isolation region comprises a lightly-doped optical waveguiding section, and each waveguide modulator segment comprises a heavily-doped optical waveguiding section.

4. An external modulator as defined in claim 1 wherein each isolation region is coupled to a DC bias source.

5. An external modulator as defined in claim 1 wherein each isolation region is coupled to a low frequency electrical signal source.

6. An external modulator as defined in claim 1 wherein the external modulator further comprises a feedback path between the output waveguiding section and the plurality of N electrical device signal sources, where the measured output optical power is used to control which signal sources are enabled and which signal sources are disabled, to adjust the extinction ratio of the modulated optical output signal on an on-going basis.

* * * * *